United States Patent

Ludewig et al.

[11] Patent Number: 6,024,273
[45] Date of Patent: Feb. 15, 2000

[54] METHOD AND SYSTEM FOR DETERMINING WELD BEAD QUALITY

[75] Inventors: Howard W. Ludewig, Groveland; Samuel L. McClallen, East Peoria; Ilhan Varol, Peoria, all of Ill.

[73] Assignee: Caterpillar Inc., Peoria, Ill.

[21] Appl. No.: 09/205,564

[22] Filed: Dec. 4, 1998

[51] Int. Cl.[7] .................................................. B23K 9/095
[52] U.S. Cl. ...................................... 228/103; 219/130.01
[58] Field of Search .................. 219/130.01, 130.21, 219/124.34; 228/103, 104

[56] References Cited

U.S. PATENT DOCUMENTS

| | | | |
|---|---|---|---|
| 4,634,879 | 1/1987 | Penney | 250/560 |
| 4,724,302 | 2/1988 | Penney et al. | 219/130.21 |
| 4,767,911 | 8/1988 | Maram et al. | 219/130.01 |
| 4,806,732 | 2/1989 | Abshire et al. | 219/124.34 |
| 4,920,249 | 4/1990 | McLaughlin et al. | 219/130.21 |
| 5,264,678 | 11/1993 | Powell et al. | 219/130.01 |
| 5,275,327 | 1/1994 | Watkins et al. | 228/102 |
| 5,283,418 | 2/1994 | Bellows et al. | 219/130.01 |
| 5,371,339 | 12/1994 | Dillet et al. | 219/124.34 |
| 5,510,596 | 4/1996 | Xu et al. | 219/124.34 |
| 5,533,146 | 7/1996 | Iwai | 382/150 |
| 5,534,676 | 7/1996 | Rinaldi et al. | 219/124.34 |

FOREIGN PATENT DOCUMENTS 0028078  2/1987  Japan .

Primary Examiner—Clifford C. Shaw
Attorney, Agent, or Firm—Howard & Howard

[57] ABSTRACT

A method for determining the quality of a weld bead includes producing a weld bead along a work surface during a welding process and scanning the weld bead with a vision system to obtain positional data points for defining a weld bead profile. The weld bead has a weld toe zone or region, which is formed at the interface between the weld bead and the work surface. A curve fit is determined for the weld bead profile bases on the positional data points obtained by the laser scan vision system. The toe radius is derived bases on the curve fit and is then compared to a first predetermined limit and a second predetermined limit, greater than the first predetermined limit, to determine the quality of the weld bead. If the toe radius is less than the first predetermined limit or greater than the second predetermined limit, the welding process is modified to produce a weld bead with a toe radius that falls within the desired range. In one embodiment the weld toe radius is determined from first and second derivations of a numerical relationship representative of the curve fit. In another embodiment the curve fit is compared to a plurality of curves to find a corresponding match and the weld toe radius is determined from the matching

30 Claims, 3 Drawing Sheets

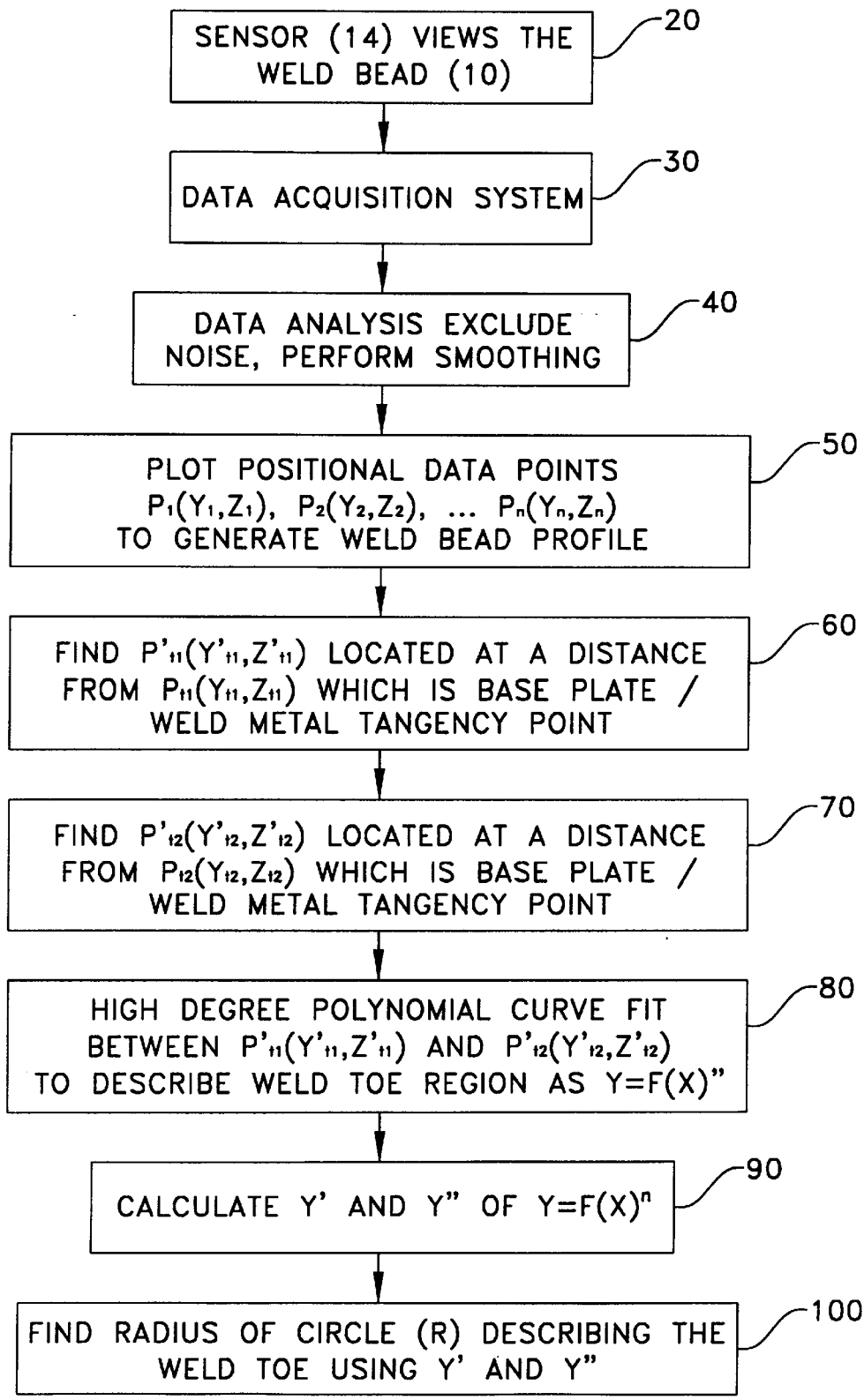

METHOD AND SYSTEM FOR DETERMINING WELD BEAD QUALITY

TECHNICAL FIELD

The present invention relates generally to methods and system for measuring a weld toe radius for determining the quality of a weld bead.

BACKGROUND ART

A welding process is used to join one metal work surface to a second metal work surface by bringing abutting surfaces from the two work surfaces into a molten state. Welding can be performed in any of various ways. It can be performed with or without the application of pressure and can be performed with or without filler material. Heat to bring the surfaces of the work surfaces to a molten state can be provided by a gas flame, an electric arc, a chemical reaction, electrical resistance, or through friction between the two work surfaces as they are moved relative to one another.

Typically, a weld bead is formed at the abutting surfaces of the work surfaces during the welding process. When using an automated welding process it is important to monitor characteristics of the weld bead to ensure that the weld bead is within a predetermined range of parameters. If a certain characteristic is not within an acceptable parameter range, corrections need to be made to the welding process to ensure the quality of the weld bead.

A weld bead has a weld toe zone or region formed at the interface between the weld bead and each of the work surfaces. One important weld bead characteristic is the weld toe radius. As the radius of the weld toe increased, the fatigue performance of the final welded work surface increases. Thus, it is important to quantify the weld toe radius for determining the fatigue performance of the final welded work surface.

Various types of systems have been used to measure certain characteristics of the weld bead, such as U.S. Pat. No. 4,634,879 issued on Jan. 6, 1987 to Penney, U.S. Pat. No. 4,724,302 issued on Feb. 9, 1988 to Penney et al., and U.S. Pat. No. 5,264,678 issued on Nov. 23, 1993 to Powell et al., for example. These systems are often complex and expensive. Thus, it is desirable to monitor weld bead quality by focusing on the weld bead toe radius and to have a simplified process that can be used off-line or in real time that is less expensive than current processes.

The present invention is directed to overcoming one or more of the problems set forth above.

DISCLOSURE OF THE INVENTION

According to one embodiment of the present invention, a method for determining the quality of a weld bead having a weld toe includes: producing a weld bead along a work surface during a welding process, scanning the weld bead to obtain positional data points for defining a weld bead profile, determining a high degree Polynomial fit for the weld bead profile based on the positional data points, deriving a weld toe radius based on the curve fit and comparing the weld toe radius to a first predetermined limit to determined the quality of the weld bead.

According to another embodiment of the invention, a method for determining the quality of a weld bead having a weld toe includes: providing a curve database including a plurality of curves, producing a weld bead along a work surface during a welding process, scanning the weld bead to obtain positional data points for defining a weld bead profile, determining a curve fit for the weld bead profile based on the positional data points, comparing the curve fit to the curve database to find a curve match, determining the toe radius based on the curve match, and comparing the weld toe radius to a first predetermined limit to determine the quality of the weld bead.

BRIEF DESCRIPTION OF THE DRAWINGS

For a better understanding of the present invention, reference may be made to the accompanying drawings in which:

FIG. 3 is a flowchart illustrating software for determining weld bead quality of the present invention.

BEST MODE FOR CARRYING OUT THE INVENTION

Figure 1:
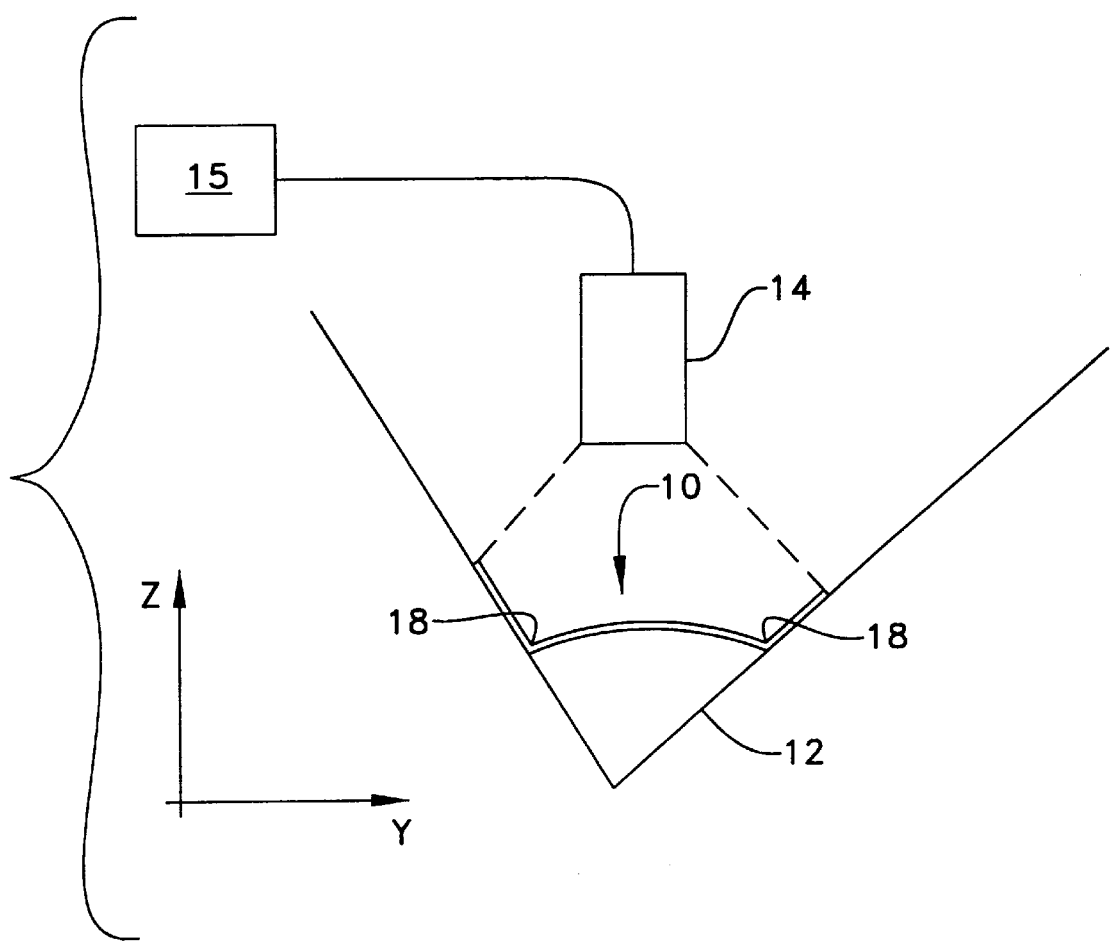
FIG. 1 is a profile of a weld bead on a work surface being scanned by a laser vision system or camera.

Referring now to the drawings, and initially to FIG. 1, wherein like numerals indicate like or corresponding parts throughout the several views, a weld bead is shown generally as numeral 10. The weld bead 10 is laid along a surface of a work surface 12 during a welding process. The welding process can be of any of various welding processes known in the art including arc welding, gas welding, friction welding, thermit welding, resistance welding, induction welding, or forge welding, for example. During the welding process or after the welding process has been completed, the weld bead 10 is scanned by a laser vision camera 14 as is well known in the art.

The laser camera 14 typically has a sensor mounted to a robot arm that emits a laser beam that is moved back and forth along the length of the weld bead 10. Thus, the laser beam begins one scan at an edge of the work surface 12 on one side of the weld bead 10 and moves across the weld bead 10 until the laser beams reaches an edge of the work surface 12 on the opposite side of the weld bead 10. The laser camera 14 then performs the next scan by directing the laser beam back across the weld bead 10 to the edge of the work surface 12 from which the first scan was initiated. The laser camera 14 performs a plurality of these scans for a given length of the weld bead 10.

During each scan of the weld bead 10 a plurality of positional data points are collected. These data points are collected as (Y, Z) coordinates with Y representing the width direction of the weld bead 10 and Z representing the depth direction of the weld bead 10. The X-axis is the axis that is established along the length of the weld bead 10, i.e., the laser camera 14 is moved along the X-axis as it performs the scans of the weld bead 10.

Figure 2:
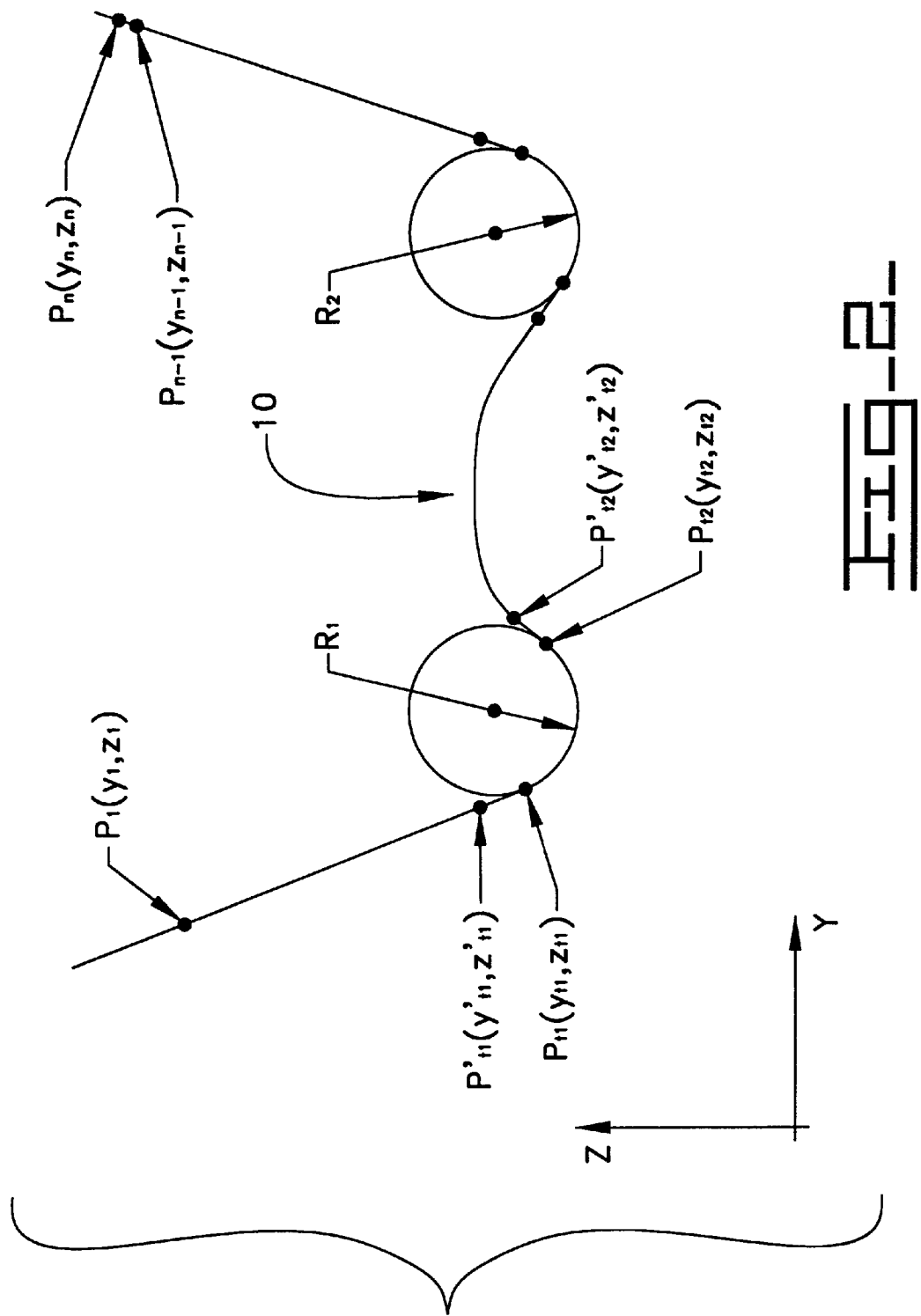
FIG. 2 is a is a graph depicting a weld bead having a profile as scanned by the laser vision shown in FIG. 1.

Positional data points generated by the laser scan are translated into a usable format to establish a weld bead profile 16, as shown in FIG. 2. Each laser scan of the weld bead 10 produces a profile as shown in FIG. 2. The weld bead 10 has a weld toe zone 18, which is formed at the interface between the weld bead 10 and the work surface 12, as shown in FIG. 1. The weld toe zone 18 is the blended zone that forms between the weld bead material and the edge of the sock surface 12 during the welding process. The weld toe zone 18 is defined by a weld toe radius R, as shown on the weld bead profile 16, as shown in FIG. 2. The points $P_{t1}$ ($y_{t1}$, $z_{t1}$) and $P_{t2}$ ($y_{t2}$, $z_{t2}$) on weld bead 10 in FIG. 2 represent work surface/weld metal tangency and weld metal/weld metal tangency points, respectively. These points are determined from positional data points obtained during laser scan. A computer, or other similar devices in the art, functions as a controller and is used to generate the curve that corresponds to the data points collected by the vision system as generally denoted by numeral 15 in FIG. 1.

The next step is to determine points $P_{t1}'(y_{t1}', z_{t1}')$ and $P_{t2}'(y_{t2}', z_{t2}')$ which are at a distance from points $P_{t1}(y_{t1}, z_{t1})$ and $P_{t2}(y_{t2}, z_{t2})$ and represent the point where the work surface 12 and the weld head 10 diverge. The curve fit including $P_{t1}'(y_{t1}', z_{t1}')$ and $P_{t2}'(y_{t2}', z_{t2}')$ points is determined in the weld toe zone 18. The weld toe radius R is then derived from the curve fit including $P_{t1}'(y_{t1}', z_{t1}')$ and $P_{t2}'(y_{t2}', z_{t2}')$ points and is compared to a predetermined limit, which will be discussed in greater detail below.

It is desirable to know the weld toe radius R for a weld bead 10 because the weld toe radius R is the determining factor for fatigue performance of the final welded work surface. As the radius of the weld toe increases, the fatigue performance of the final welded work surface increases. Once the desired fatigue performance limits for a work surface have been established, an acceptable range of weld toe radii is determined. The range is established based on various factors including the size of the weld, the material of the work surface, and the type of final welded product that is being produced, for example. This range has a first predetermined limit and a second predetermined limit, which is greater than the first predetermined limit, i.e., the range has a lower and upper limit. If the weld toe radius falls within the range, the weld bead 10 has met the predetermined requirements and the welding process can continue. If the weld toe radius R is not within the range, if the radius R is less than the first predetermined limit or greater than the second predetermined limit, the weld bead 10 has not met the predetermined requirements and the welding process should be modified.

The first predetermined limit for an acceptable weld toe radius R is established based on the weld size, work surface material, and type of final product, as well as other factors known in the art used to establish parameters for acceptable fatigue performance for a product. This first predetermined limit represents the minimum acceptable weld toe radius R to achieve the desired fatigue performance for a final welded product. The second predetermined limit, or the upper limit, is established by geometrical limitations. While fatigue performance increases as the weld toe radius R increases, the weld toe radius R can only be increased to a certain limit before it is restricted by geometrical configurations of the work surface 12 and the weld bead 10.

The curve fit including $P_{t1}'(y_{t1}', z_{t1}')$ and $P_{t2}'(y_{t2}', z_{t2}')$ points is preferably isolated mathematically by using a computer or other similar computational devices known in the art. In one embodiment of the invention, a numerical relationship representing the curve fit including $P_{t1}'(y_{t1}', z_{t1}')$ and $P_{t2}'(y_{t2}', z_{t2}')$ points is established from the positional data points. An example of such a numerical relationship is $y=f(x)^n$ where y represents the weld toe zone curve as a function of x, $f(x)$, and n is a high degree polynomial, preferably in the range of six to eight. As discussed above, this numerical relationship representing the curve fit including $P_{t1}'(y_{t1}', z_{t1}')$ and $P_{t2}'(y_{t2}', z_{t2}')$ points is generated by a computer or by another similar device based on the positional data points collected during the laser scar. The first and second derivatives of the numerical relationship representing the curve fit including $P_{t1}'(y_{t1}', z_{t1}')$ and $P_{t2}'(y_{t2}', z_{t2}')$ points are then calculated by standard methods known in the art and are then used to determine the weld toe radius R.

The first derivative of the numerical relationship is $y'=n\,f(x)^{n-1}$ and the second derivative of the numerical relationship is $y''=n\,(n-1)f(x)^{n-2}$ where y represents the weld toe zone curve as a function of x, $f(x)$, and n is a high degree polynomial. The weld toe radius R is then determined based on the first and second derivatives of the numerical relationship representing the curve including $P_{t1}'(y_{t1}', z_{t1}')$ and $P_{t2}'(y_{t2}', z_{t2}')$ points with the following formula: $1/R = y''/(1+y'^2)^{1.5}$ wherein R is the weld toe radius, y'' is the second derivative of ache numerical relationship, and y' is the first derivative of the numerical relationship. These same procedures and sequence of operations are repeated to obtain weld toe radius for the right side of the weld bead 10. Hence, two radii are obtained for full description of weld bead 10.

This method of determining the weld toe radius R can be used as on off-line method for determining the quality of the weld bead 10. If the weld toe radius R does not fall within the desired range, the welding process can be modified by adjusting weld parameters such as current, speed, and material, for example. Alternatively, the method can be used real time to control the welding process through a feedback loop.

In another embodiment of the invention, the method for determining the quality of the weld bead 10 having a weld toe zone 18 includes comparing the curve fit including $P_{t1}'(y_{t1}', z_{t1}')$ and $P_{t2}'(y_{t2}', z_{t2}')$ points to a curve database having a plurality of curves, each with a defined radius. As previously stated, points $P_{t1}'(y_{t1}', z_{t1}')$ and $P_{t2}'(y_{t2}', z_{t2}')$ are at a distance from points $P_{t1}(y_{t1}, z_{t1})$ and $P_{t2}(y_{t2}, z_{t2})$ and represent the points where the work surface 12 and the weld bead 10 diverge. This method involves producing the weld bead 10 along a work surface 12 during the welding process, scanning the weld bead 10 to obtain positional data points for defining a weld bead profile 16, determining the curve fit including $P_{t1}'(y_{t1}', z_{t1}')$ and $P_{t2}'(y_{t2}', z_{t2}')$ points for the weld bead profile 16 based on the positional data points, and comparing the curve fit points including $P_{t1}'(y_{t1}', z_{t1}')$ and $P_{t2}'(y_{t2}', z_{t2}')$ to the curve database to find a curve match. The weld toe radius R is determined based on the curve match and is then compared to the lower and upper limits of the desired range of weld toe radii. If the weld toe radius is less than the lower limit or is greater than the upper limit, the welding process can be modified to produce weld beads 10 that fall within the desired range, as discussed above.

This method of determining the weld toe radius R can be used as an off-line method for determining the quality of the weld bead 10. If the weld toe radius R does not fall within the desired range, the welding process can be modified. Alternatively, the method can be used real time to control the welding process through a feedback loop.

The positional data points are preferably translated into spatial coordinates and the curves in the curve database are preferably provided with defined reference coordinates indicating the respective radii for each curve. This allows for an efficient comparison between the spatial coordinates of the weld bead profile 16 and the defined reference coordinates of the curve database to indicate the appropriate radius for the curve match. In some instances, the curve fit including $P_{t1}'(y_{t1}', z_{t1}')$ and $P_{t2}'(y_{t2}', z_{t2}')$ points will be close to two (2) curves in the curve database. In this situation, a weld toe radius range is defined and has a lower value and an upper value.

The method used in this situation would include the further steps of finding a first curve match in the curve database having a first weld toe radius, finding a second curve match in the curve database having a second weld toe radius, and establishing the weld toe radius range representing the weld toe radius of the weld bead based on the two (2) curve matches.

An artificial neural network pattern comparison process or pattern recognition process is preferably used for comparing the curve fit including $P_{t1}'(y_{t1}', z_{t1}')$ and $P_{t2}'(y_{t2'}, z_{t2}')$ points to the curves in the curve database to find a curve match. This is an efficient process for quickly finding the appropriate radius that corresponds to the weld toe radius R of the weld bead 10. This process has been used for matching fingerprints to fingerprints stored in a fingerprint database to find a match, for example.

The process of determining the weld toe radius will now be discussed with reference to a flowchart as shown in FIG. 3. In the description of the flowcharts, the functional explanation marked with numerals in angle brackets, <nnn>, will refer to the flowchart blocks bearing that number. As shown in FIG. 3, the sensor 14 first views the weld bead 10 <20>. The next step is to acquire data from the sensor 14 as t views the weld bead 10 <30>. Data analysis is then performed which performs a filtering and smoothing function and excludes noise <40>. A plot is generated using $P_1(y_1, z_1)$, $P_2(y_2, z_2) \ldots P_n(y_n, z_n)$ describing weld bead profile <50>. $P_{t1}'(y_{t1}', z_{t1}')$ points are then determined which represent the work surface/weld metal divergence points obtained from positional data points obtained during a laser scan. $Pt_{t1}'(y_{t1}', z_{t1}')$ point is then determined which is at a distance from point $P_{t1}(y_{t1}, z_{t1})$ and represents the point where the work surface 12 and the weld bead 10 diverge while $P_{t1}(y_{t1}, z_{t1})$ represents the work surface metal/weld metal tangency point obtained from positional data points obtained during laser scan <60>. $P_{t2}'(y_{t2}', z_{t2}')$ point is then determined which is at a distance from point $P_{t2}(y_{t2}, z_{t2})$ and represents the point where the weld toe zone 18 and weld bead 10 diverge while $P_{t2}(y_{t2}, z_{t2})$ represents the weld metal/weld metal tangency point obtained from positional data points obtained during laser scan <70>.

There is then a high degree polynomial curve fit between $P_{t1}'(y_{t1}', z_{t1}')$ and $P_{t2}'(y_{t2}', z_{t2}')$ to describe the weld toe zone as: $y=f(x)^n$ <80>. The first and second derivative is then calculated where the first derivative of the numerical relationship is $y'=n\ f(x)^{n-1}$ and the second derivative of the numerical relationship is $y''=n\ (n-1)f(x)^{n-2}$ where y represents the weld toe zone curve as a function of x, f(x), and n is a high degree polynomial <90>.

The weld toe radius R is then determined based on the first and second derivatives of the numerical relationship representing the curve including $P_{t1}'(y_{t1}', z_{t1}')$ and $P_{t2}'(y_{t2}', z_{t2}')$ points with the following formula: $1/R=y''/(1+y'^2)^{1.5}$ wherein R is the weld toe radius, y" is the second derivative of the numerical relationship, and y' is the first derivative of the numerical relationship. These same procedures and sequence of operations are repeated to obtain weld toe radius for the right side of the weld bead 10. Hence, two radii are obtained for full description of weld bead 10 <100>.

Industrial Applicability

The present invention relates generally to methods for measuring a weld toe radius for determining the quality of a weld bead. By monitoring the weld bead applied to a work surface to determine the weld toe radius, a comparison can be made between the actual weld toe radius and a desired weld toe radius. If the actual weld toe radius is different than the desired weld toe radius, corrections can be made to the welding process to improve the profile of the weld bead.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be an any way limiting, the invention may be practiced otherwise than as specifically described.

We claim:

1. A method for determining the quality of a weld bead having a weld toe comprising the steps of:
   producing a weld bead along a work surface during a welding process;
   scanning the weld bead to obtain positional data points for defining a weld bead profile;
   determining a curve fit for the weld bead profile based on the positional data points;
   deriving a weld toe radius based on the curve fit; and
   comparing the weld toe radius to a first predetermined limit to determine the quality of the weld bead.

2. The method as set forth in claim 1, further including the step of modifying the welding process if the weld toe radius is less than the first predetermined limit.

3. The method as set forth in claim 2, further including steps of comparing the weld toe radius to a second predetermined limit greater than the first Predetermined limit and modifying the welding process if the weld toe radius exceeds the second predetermined limit.

4. The method as set forth in claim 1, wherein the step of determining a curve fit for the weld bead profile includes determining a curve fit for a portion of the weld bead profile near the weld toe based on the positional data points.

5. The method as set forth in claim 4, further including the step of translating the curve fit for the portion of the weld bead profile near the weld toe into a numerical relationship.

6. The method as set forth in claim 5, further including the steps of determining the first derivative of the numerical relationship, determining the second derivative of the numerical relationship, and deriving the weld toe radius from the first and second derivatives.

7. The method as set forth in claim 4, wherein the step of determining a curve fit for the weld bead profile includes determining a curve fit for a portion of the weld bead profile near the weld toe based on the positional data points including points of divergence between the weld bead and the work surface.

8. The method as set forth in claim 1, further including the step of providing real time feedback to modify the welding process if the weld toe radius is less than the first predetermined limit.

9. The method as set forth in claim 8, further including the step of comparing the weld toe radius to a second predetermined limit greater than the first predetermined limit and providing real time feedback to modify the welding process if the weld toe radius exceeds the second predetermined limit.

10. The method as set forth in claim 1, wherein the scanning of the weld bead is performed by a laser based vision system.

11. A method for determining the quality of a weld bead having a weld toe comprising the steps of:
    providing a curve database including a plurality of curves;
    producing a weld bead along a work surface during a welding process;
    scanning the weld bead to obtain positional data points for defining a weld bead profile;
    determining a curve fit for the weld bead profile based on the positional data points;

comparing the curve fit to the curve database to find a curve match determining a weld toe radius based on the curve match; and comparing the weld toe radius to a first predetermined limit to determine the quality of the weld bead.

12. The method as set forth in claim 11, further including the step of modifying the welding process if the weld toe radius is less than the first predetermined limit.

13. The method as set forth in claim 12, further including steps of comparing the weld toe radius to a second predetermined limit greater than the first predetermined limit and modifying the welding process if the weld toe radius exceeds the second predetermined limit.

14. The method as set forth in claim 11, wherein the step of determining a curve fit for the weld bead profile includes determining a curve fit for a portion of the weld bead profile near the weld toe based on the positional data points.

15. The method as set forth in claim 14, further including the steps of finding a first curve match in the curve database having a first weld toe radius, finding a second curve match in the curve database having a second weld toe radius, and establishing a weld toe radius range defined by the first weld toe radius and the second weld toe radius representing the weld toe radius of the weld bead.

16. The method as set forth in claim 11, further including the step of providing real time feedback to modify the welding process if the weld toe radius is less than the first predetermined limit.

17. The method as set forth in claim 11, further including the steps of providing the curves in the curve database with defined spatial reference coordinates and translating the positional data points obtained by scanning the weld bead profile into spatial coordinates for comparison with the defined spatial reference coordinates in the curve database.

18. The method as set forth in claim 17, wherein said defined spatial reference coordinates include points of divergence between said weld bead and said work surface.

19. The method as set forth in claim 11, including the step of using an artificial neural network pattern comparison process for comparing the curve fit to the curve database to find a curve match.

20. A method for determining a weld toe radius comprising the steps of:

scanning a weld bead to obtain positional data points for defining a weld bead profile;

determining a curve fit for the weld bead profile based on the positional data points;

deriving a weld toe radius based on the curve fit; and comparing the weld toe radius to a first predetermined limit to determine the quality of the weld bead.

21. The method as set forth in claim 20, wherein the step of deriving the weld toe radius includes translating the curve fit into a numerical relationship, determining the first derivative of the numerical relationship, determining the second derivative of the numerical relationship, and deriving the weld toe radius based on the first and second derivatives.

22. A method as set forth in claim 20, wherein the step of deriving the weld toe radius includes providing a curve database including a plurality of curves, comparing the curve fit to the curve database to find a curve match, and determining the toe radius based on the curve match.

23. A method as set forth in claim 20, wherein said positional data points include points of divergence between said weld bead and a work surface.

24. A system for determining the quality of a weld bead produced during a welding process comprising:

a welding apparatus for producing a weld bead along a work surface, said weld bead having a weld toe radius at an interface between said weld bead and said work surface;

a sensor for measuring said weld bead to obtain positional data points for defining a weld bead profile; and a controller for determining a curve fit for said weld bead profile based on the positional data points and for deriving said weld toe radius based on the curve fit wherein said controller compares said weld toe radius to a first predetermined limit to determine the quality of said weld bead.

25. The system as set forth in claim 24, wherein said controller generates a signal to modify the welding process if said weld toe radius is less than the first predetermined limit.

26. The system as set forth in claim 24, wherein said sensor measures said weld bead as said weld bead is applied to said work surface during the welding process and said controller generates a feedback signal for modifying the welding process real time if said weld toe radius is less than the first predetermined limit.

27. The system as set forth in claim 24, wherein said sensor measures said weld bead after the welding process has been completed.

28. The system as set forth in claim 27, wherein said first sensor is a laser vision camera.

29. The system as set forth in claim 24, wherein said controller includes a curve database having a plurality of pre-defined curves such that said controller determines a curve fit for the weld bead profile based on the positional data points obtained by said first sensor and compares the curve fit to said curve database to find a curve match, said weld toe radius being derived from said curve match.

30. The system as set forth in claim 24, wherein said positional data points include points of divergence between the weld bead and the work surface.

* * * * *

UNITED STATES PATENT AND TRADEMARK OFFICE
CERTIFICATE OF CORRECTION

PATENT NO. : 6,024,273
DATED : February 15, 2000
INVENTOR(S) : Ludewig et al.

It is certified that error appears in the above-identified patent and that said Letters Patent is hereby corrected as shown below:

Lines 8 and 9
In the Abstract the word "bases" was mistakenly substituted for "based" in two separate places. The word appears as "based" in our Application No. 09/205,564, filed on December 4, 1998.

In the Abstract the word "curve" was omitted from the last sentence. It should read "In another embodiment the curve fit is compared to a plurality of curves to find a corresponding match and the weld toe radius is determined from the matching curve".

Signed and Sealed this

Fourteenth Day of November, 2000

Attest:

Q. TODD DICKINSON

*Attesting Officer*     *Director of Patents and Trademarks*